United States Patent

[11] 3,600,017

| [72] | Inventor | Jeremy D. Scherer<br>South Dartmouth, Mass. |
|---|---|---|
| [21] | Appl. No. | 708,100 |
| [22] | Filed | Feb. 26, 1968 |
| [45] | Patented | Aug. 17, 1971 |
| [73] | Assignee | Isotronics, Inc.<br>New Bedford, Mass.<br>Continuation-in-part of application Ser. No.<br>612,590, Jan. 30, 1967, now abandoned. |

[54] HERMETIC METAL-TO-GLASS SEALS
11 Claims, 3 Drawing Figs.

| [52] | U.S. Cl. | 287/189.365 |
|---|---|---|
| [51] | Int. Cl. | F16b 11/00 |
| [50] | Field of Search | 287/189.365 |

[56] References Cited
UNITED STATES PATENTS

| 2,235,325 | 3/1941 | Möhrle et al. | 287/189.365 |
|---|---|---|---|
| 2,651,144 | 9/1953 | Foley et al. | 287/189.365 |
| 2,659,183 | 11/1953 | Anderson | 287/189.365 |
| 2,885,826 | 5/1959 | Grieve et al. | 287/189.365 |
| 3,302,961 | 2/1967 | Franklin | 287/189.365 |
| 3,370,874 | 2/1966 | Scherer et al. | 287/189.365 |

*Primary Examiner*—David J. Williamowsky
*Assistant Examiner*—Wayne L. Shedd
*Attorney*—Birch, Swindler, McKie & Beckett

ABSTRACT: A hermetic metal-to-glass seal with a steel aperture-containing member clad with a ductile, corrosion-resistant metal and at least one corrosion-resistant terminal sealed in said aperture by said glass and electrical devices employing such seals.

PATENTED AUG 17 1971

3,600,017

INVENTOR
JEREMY D. SCHERER

BY Irons, Birch, Swindler & McKie
ATTORNEYS

HERMETIC METAL-TO-GLASS SEALS

This application is a continuation-in-part of application Ser. No. 612,590 filed Jan. 30, 1967, now abandoned, entitled: Hermetic Metal-to-Glass Seals, Application Thereof and Methods of Making the Same.

This invention relates to hermetic metal-to-glass seals and to electrical devices employing such seals.

Manufacturers of electrical devices such as liquid or paste electrolyte capacitors and electromechanical devices have encountered problems with the leakage of electrolyte. The electrolytes commonly used in capacitors, for example, contain such corrosive chemicals as lithium chloride, sulfuric acid, phosphoric acid, acetic acid and the like. If the electrolyte leaks out of the capacitor, it not only degrades the performance of the capacitor but often destroys the equipment in which the capacitor is used. Liquid electrolyte capacitors frequently have been sealed by means of a Teflon O-ring placed under pressure. Although this type of seal is fairly effective, over a period of time such conditions as shock, vibration, changes in temperature, and the like often cause the Teflon O-ring seal to lose its effectiveness, resulting in a leakage of electrolyte.

In order to improve upon the Teflon O-ring seal manufacturers of tantalum capacitors have employed what is commonly called a redundant seal. The redundant seal is usually composed of an inner seal of the common Teflon O-ring type and an outer seal of the conventional glass-to-metal type. The outer seal is usually made with a steel outer member or eyelet, a potash-soda-barium glass, such as Corning 9010, and inner conductors or terminals of nickel-iron alloy. Other versions of this seal include the use of corrosion-resistant stainless steel, titanium, and other acid resistant materials for the outer member and tantalum or niobium for the inner conductor. The theory of the redundant seal is that the inner Teflon O-ring seal prevents the corrosive electrolyte of the capacitor from coming in direct contact with the outer seal while the outer seal hermetically closes the capacitor. The redundant seal is fairly effective but is considerably more space consuming and expensive than the seal contemplated in this specification. With the redundant seal there is always the possibility that the inner seal may have a massive failure thus allowing the electrolyte to attack and destroy the outer hermetic seal which would lead to a complete failure of the capacitor.

Copending application Ser. No. 566,901 filed July 21, 1966 (U.S. Pat. No. 3,370,874) describes an effective glass seal to a tantalum or niobium terminal and thereby provides a means for avoiding the previous uncertainty with regard to the reliability of the glass seal to those terminal metals. As noted in U.S. Pat. No. 3,370,874 the aperture member for some applications may be of a corrosion-resistant metal such as tantalum, titanium, silver or the like. While members made of such metal exhibit good corrosion resistance, they are obviously expensive.

In accordance with this invention there is provided a new hermetic metal-to-glass compression seal comprising a steel aperture-containing member clad with a ductile, corrosion-resistant metal and at least one corrosion-resistant terminal extending through such aperture and out of contact with said aperture-containing member, said terminal being sealed in said aperture by fused glass having a positive meniscus with respect to said terminal.

The aperture-containing member of this invention (hereafter referred to as an eyelet for convenience) provides protection against corrosion but is substantially less expensive than eyelet members made entirely from the corrosion-resistant metal. Moreover the clad eyelet is better suited for compression seals because of the mechanical strength of the steel base. Eyelets fabricated from ductile materials tend to lose their compressive strengths because of the ductility of the eyelet material.

The use of clad eyelets also permits compression seals to be fabricated employing an eyelet material having a coefficient of expansion equal to or less than the terminal, e.g., a tantalum terminal and tantalum eyelet cladding. If the eyelet were made entirely from tantalum it is not possible to provide a seal, for example, in which the terminal, glass and eyelet have successively higher coefficients of expansion. Such compression seal, however, readily can be provided employing, for example, a tantalum terminal and tantalum-clad steel eyelet since the eyelet coefficient of expansion will be essentially controlled by the steel base member.

Since steel is a poorer conductor of heat than materials such as silver, gold and the like, the use of steel-clad eyelets also minimizes the risk that the glass terminal seal will be damaged when the eyelet is welded to the container or that liquid electrolytes will be caused to boil. Materials such as silver, gold and the like transfer heat away from the weld so readily that the entire eyelet may become excessively hot and seal damage or electrolyte boiling may occur. The lower heat transfer of the steel permits weld temperatures to be reached more easily and tends to maintain the heat at the weld.

Base steel members coated with electrolytically deposited layers of corrosion-resistant metals are not suitable for the practice of this invention. Plated coatings tend to be too porous to withstand the stringent corrosion-resistant requirements of many electrical devices. Plated coatings of proper thickness also frequently require an inordinate amount of processing.

The invention may be more fully understood with reference to the accompanying drawing.

Figure 1:
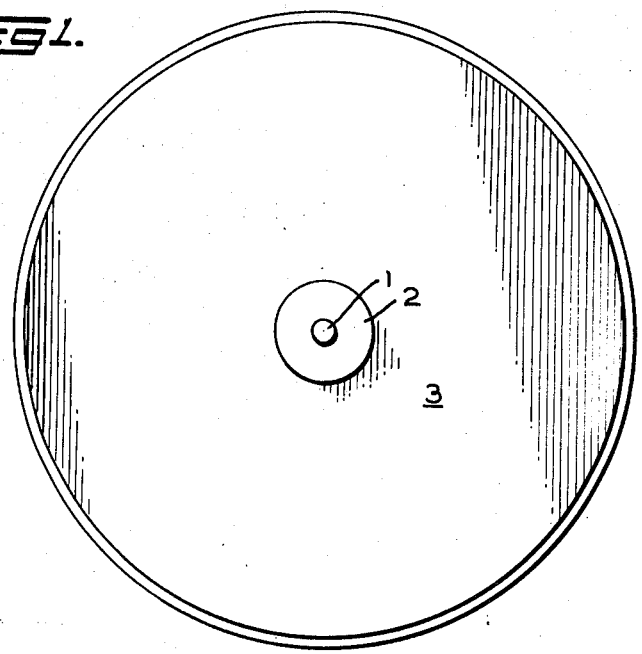
FIG. 1 represents a plan view of a typical seal.
Figure 2:
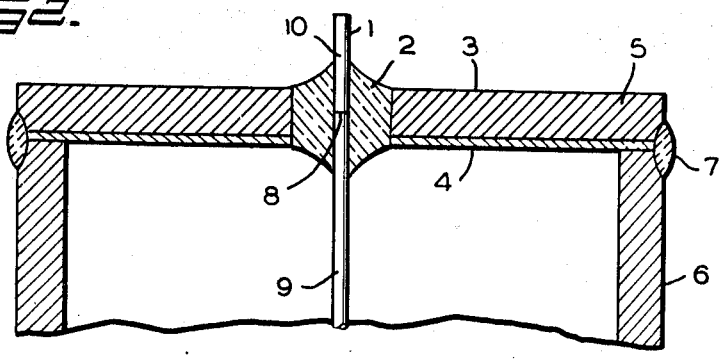
FIG. 2 represents a transverse section through a typical seal component attached to a capacitor or other electrical device.

Referring specifically to FIGS. 1 and 2, 1 represents a terminal member and 2 represents the glass seal disposed between terminal member 1 and aperture-containing member 3. The glass forms a hermetic seal with respect to both terminal member 1 and aperture-containing member 3. As shown in FIG. 2, aperture-containing member 3 comprises a steel base 5 and a cladding of ductile, corrosion-resistant metal 4 on the side exposed to the corrosive medium. It will be apparent that, if desired, additional surfaces of aperture-containing member 3 may also be clad with a ductile corrosion-resistant metal.

In FIG. 2 the seal is welded to electrical container 6 by a weld bead 7. Terminal 1 is depicted as comprising an electrolytic oxide film-forming lead wire 9 joined (e.g., welded) at junction 8 in the fused glass 2 to external lead wire 10 which desirably is a more ductile material such as nickel or the like.

Figure 3:
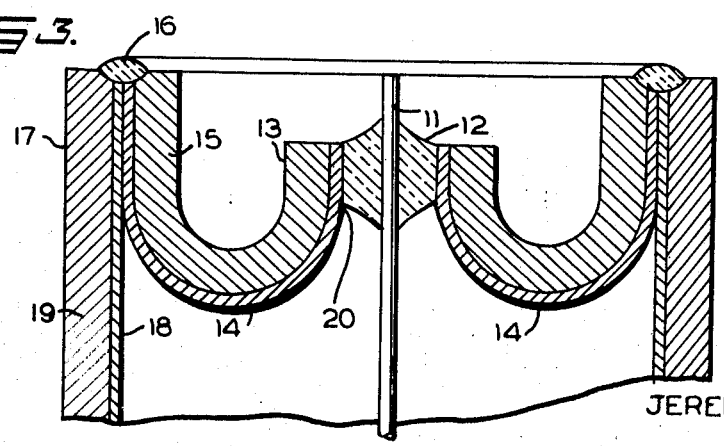
FIG. 3 represents a transverse section of one preferred seal attached to a capacitor or other electrical device.

FIG. 3 represents a transverse section of one preferred seal. Terminal 11 is sealed by glass mass 12 to aperture-containing member 13 which has a steel base 15 and is clad with a ductile corrosion-resistant metal 14. The seal is welded to the walls of electrical device 17 made up of a steel base 19 clad with ductile, corrosion-resistant metal 18. The parts desirably provide a pressure fit and are further sealed by weld 16. The joint of the glass 12 to the aperture-containing member 15 may be controlled by providing a sharp edge 20 on the surface of cladding 14. The curvature of the eyelet adjacent the aperture insures that the corrosion-resistant cladding will extend substantially under the glass seal and therefore provide maximum assurance against leakage. The curvature of the eyelet at its outer edge permits a pressure fit with the container and again provides maximum assurance against leakage. It will be apparent that, if desired, only the edge of the eyelet adjacent the aperture can be curved.

The electrical device container as shown is a solid member in FIG. 2 and a clad member in FIG. 3. Either embodiment of the electrical container may be used in conjunction with any seal. It will further be apparent that the electrical container can be clad on both its inner and outer surface if desired.

The seal of this invention employs a corrosion-resistant material such as tantalum, niobium, platinum alloys, tungsten, silver, titanium or the like. A preferred terminal material is an electrolytic oxide film-forming metal such as tantalum, niobium or the like. While the seal of this invention has been described with respect to a single terminal, such description is for convenience only since a plurality of terminals may extend through one or more eyelet apertures. The terminal may extend entirely through the glass seal or, alternatively, it may be joined to a more ductile lead in the fused glass to provide added strength for the junction. The ductile lead can also be bent closer to the glass seal and therefore reduce the effective overall length of the electrical device. The terminal may also be fused directly into the slug of a capacitor. While the drawings show a solid terminal, it may be a hollow tube. When a hollow tube is used in the seal, a wire may be placed through the tube and the tube welded shut to the wire.

The glass employed for the seal may be any glass normally employed in corrosive use so long as it exhibits the proper expansion coefficient characteristics. The mean coefficient of expansion of the glass should be at least as great as the coefficient of expansion of the terminal but less than the coefficient of expansion of the eyelet member. In a preferred embodiment of the invention, the glass has a coefficient of expansion greater than the metal terminal but less than the eyelet. The work point of the glass must be below the softening point of any of the metal components.

The eyelet base may be chosen from any of a wide variety of steels. The term steel as employed herein includes mild steel, iron or steel alloys and stainless steels. The thickness of the base will, of course, be dependent upon the specific service contemplated. Generally, however, the base will be at least about 0.010 or 0.015 inch thick in order to provide satisfactory compressive forces. The coefficient of expansion of the eyelet will be primarily controlled by the coefficient of the base metal.

The cladding is of ductile, corrosion-resistant metal such as silver, gold, copper, tantalum, platinum, niobium, aluminum, and the like. Silver and copper cladding is particularly preferred. The thickness of the cladding will be dependent both upon the corrosion resistance of the metal selected and the service in which it will be employed. Typical claddings approximate 0.005 inch in thickness, but the cladding may be 0.001 inch thick or less or 0.010 inch thick or more. While in most instances the corrosion-resistant metal will be clad directly to the steel an intermediate layer of a dissimilar metal can be employed if desired.

For seals employing tantalum or niobium terminals coefficients of expansion of typical, suitable materials (units per unit length per ° C.) are: tantalum—$66 \times 10^{17}$; niobium—$74 \times 10^{17}$; glasses—$70$—$100 \times 10^{17}$ or higher; steels $75$—$140 \times 10^{17}$ or higher. The choice of glass and eyelet materials for other terminals is within the skill of the routineer. Generally it is desirable that the eyelet have a coefficient of expansion at least about 10 units higher than the coefficient of expansion of the glass.

The term "clad" as employed herein has reference to the products obtained from cladding processes well-known to the art. These processes effect a high-pressure, solid-phase bond and can employ heat during the bonding process.

The hermetic glass-to-metal seal may be manufactured according to methods known to the art. A preferred seal is obtained according to the disclosure of U.S. Pat. No. 3,370,874. For example, the glass mass is placed around an oxide-free tantalum or niobium terminal in an inert atmosphere such as argon and the unit is heated to a temperature and for a time sufficient to permit the glass to form a positive meniscus with respect to the terminal. After the seal is formed an electrolytic oxide may be deposited on the terminal and the seal is welded to a capacitor or other electrical device.

The following example is included by way of illustration only and is not intended to limit the scope of this invention.

EXAMPLE

A tantalum terminal about 0.45 inch long and about 0.020-inch diameter was placed through the aperture of an eyelet having the general configuration of the eyelet shown in FIG. 3. The eyelet was made from 0.025-inch thick mild steel with an 0.005-inch thick silver cladding; had an outside diameter of 0.355 inch and an inside diameter 0.098 inch; a height at its outer edge of 0.135 inch and a height at the aperture of 0.070 inch. A preformed toroid of potash-soda glass (Mansol 63) modified by small additions of lead and boric oxide was placed in the space between the terminal and the eyelet. The unit was heated in an argon atmosphere to about 1,600° F. until the glass formed a positive meniscus with respect to the tantalum terminal. The unit was cooled to atmospheric temperature in the inert atmosphere and was an effective hermetic glass-to-metal seal.

The present invention contemplates not only the seal components but capacitors, electrochemical timing devices, and other electrical devices employing such seals. Since variations will be apparent to those skilled in the art, it is intended that this invention be limited only by the scope of the appended claims.

I claim:

1. A hermetic glass-to-metal seal comprising a steel aperture-containing member clad by a high-pressure, solid-phase bond with a ductile corrosion-resistant metal on at least one side of said aperture-containing member and at least one corrosion-resistant terminal extending through such aperture and out of contact with said aperture-containing member, said terminal being sealed in said aperture by fused glass, the coefficient of expansion of the glass being at least as great as the coefficient of expansion of the terminal and less than the coefficient of expansion of the aperture-containing member.

2. The seal of claim 1 having an electrolytic oxide film-forming terminal.

3. The seal of claim 2 in which the terminal is tantalum.

4. The seal of claim 1 in which the aperture-containing member is clad with copper.

5. The seal of claim 1 in which the aperture-containing member is clad with silver.

6. The seal of claim 1 in which the glass has a coefficient of expansion greater than the coefficient of expansion of the terminal.

7. The seal of claim 1 in which the terminal junction to a ductile outside lead is in the fused glass.

8. The seal of claim 1 in which the aperture-containing member has an outwardly curved lip defining said aperture and is clad on at least its inner surface.

9. The seal of claim 6 in which the aperture-containing member has an outwardly curved lip defining its outer edge.

10. The seal of claim 1 in which the cladding has a coefficient of expansion not greater than the coefficient of expansion of the terminal.

11. In a hermetically sealed electrical device, a glass-to-metal seal comprising a steel aperture-containing member clad by a high pressure solid phase bond with a ductile corrosion-resistant metal on at least one side of said aperture-containing member and at least one corrosion-resistant terminal extending through such aperture and out of contact with said aperture-containing member, said terminal being sealed in said aperture by fused glass, the coefficient of expansion of the glass being at least as great as the coefficient of expansion of the terminal and less than the coefficient of expansion of the aperture-containing member.